US006463468B1

(12) United States Patent
Buch et al.

(10) Patent No.: US 6,463,468 B1
(45) Date of Patent: Oct. 8, 2002

(54) TARGETED NETWORK VIDEO DOWNLOAD INTERFACE

(75) Inventors: Robert Daniel Buch, San Francisco, CA (US); Ryan Brice Cunningham, San Francisco, CA (US)

(73) Assignee: Netzero, Inc., Westlake Village, CA (US)

( * ) Notice: Subject to any disclaimer, the term of this patent is extended or adjusted under 35 U.S.C. 154(b) by 0 days.

(21) Appl. No.: 09/323,706

(22) Filed: Jun. 1, 1999

(51) Int. Cl.[7] .............................................. G06F 15/16
(52) U.S. Cl. ...................... 709/219; 709/229; 709/232; 709/217; 725/42; 725/43
(58) Field of Search ................................ 709/224, 226, 709/229, 217, 218, 219, 223, 232; 705/14, 54, 26, 27; 707/10, 513; 725/42, 43

(56) References Cited

U.S. PATENT DOCUMENTS

| 5,019,963 A | 5/1991 | Alderson |
| 5,105,184 A | 4/1992 | Pirani |

(List continued on next page.)

FOREIGN PATENT DOCUMENTS

| CA | 2244002 | 7/1997 |
| CA | 2247325 | 9/1997 |
| CA | 2247330 | 9/1997 |
| EP | 0 811 942 A2 | 12/1997 |
| EP | 923036 | 12/1997 |
| EP | 0 822 535 A2 | 2/1998 |
| GB | 2328537 | 11/1997 |
| WO | WO 97/21183 | 12/1995 |
| WO | WO 97/40601 | 4/1996 |
| WO | WO 97/07656 | 3/1997 |

(List continued on next page.)

OTHER PUBLICATIONS

International Preliminary Examination Report for PCT Application No. PCT/US00/14853 mailed Mar. 1, 2002.

International Preliminary Examination Report for PCT Application No. PCT/US00/14853 mailed Nov. 1, 2001.

Primary Examiner—Mark H. Rinehart
Assistant Examiner—William C. Vaughn, Jr.
(74) Attorney, Agent, or Firm—Steven C Sereboff; SoCal IP Law Group (57) ABSTRACT

A system provides a user with free Internet network access, in which an access control system sends video advertising files to a user who gains access to the Internet through a network connection that includes a viewer program that operates independently of the user's browser and e-mail programs. The viewer receives ads from the access control system and manages an ad pool that collects multiple video advertising files. Video advertising files are downloaded when the user is not actively using the bandwidth of the Internet connection to download Internet content of the user's choosing. The viewer program periodically opens a viewer window, which opens on top of any other open windows, and in which a video ad from the ad pool is displayed. When one or more video ads are finished, the viewer window is hidden or made an inactive window for a quiet interval. At the conclusion of the quiet interval, the viewer widow is activated and the next ad in the ad pool is displayed. The viewer program cycles through existing ads in the ad pool until a new ad is received from the access server. The viewer program manages the ad pool such that the oldest ad is discarded when a new ad is received, and such that each ad is displayed or viewed in order of download for the average time it takes to download an ad in the ad pool. This ensures that ad viewing can continuously cycle through the ad pool with the minimum of repetition, and with no interruption to the user's Internet experience.

35 Claims, 9 Drawing Sheets

U.S. PATENT DOCUMENTS

| | | | |
|---|---|---|---|
| 5,305,195 A | | 4/1994 | Murphy |
| 5,319,455 A | | 6/1994 | Hoarty |
| 5,446,919 A | | 8/1995 | Wilkins |
| 5,504,675 A | | 4/1996 | Cragun |
| 5,572,643 A | | 11/1996 | Judson |
| 5,584,025 A | | 12/1996 | Keithley |
| 5,608,446 A | * | 3/1997 | Carr et al. ................... 348/6 |
| 5,636,346 A | | 6/1997 | Saxe |
| 5,643,088 A | | 7/1997 | Vaughn |
| 5,717,604 A | * | 2/1998 | Wiggins .................. 709/229 |
| 5,717,923 A | | 2/1998 | Dedrick |
| 5,721,827 A | * | 2/1998 | Logan et al. ............... 709/217 |
| 5,724,521 A | | 3/1998 | Dedrick |
| 5,737,619 A | | 4/1998 | Judson |
| 5,740,549 A | * | 4/1998 | Reilly et al. ................. 705/14 |
| 5,761,662 A | | 6/1998 | Dasan |
| 5,781,894 A | | 7/1998 | Petrecca |
| 5,794,210 A | * | 8/1998 | Goldhaber et al. .......... 705/14 |
| 5,796,952 A | * | 8/1998 | Davis et al. ............... 709/224 |
| 5,809,144 A | * | 9/1998 | Sirbu et al. .................. 705/53 |
| 5,809,242 A | * | 9/1998 | Shaw et al. ................ 709/217 |
| 5,823,879 A | | 10/1998 | Goldberg |
| 5,848,397 A | * | 12/1998 | Marsh et al. ................. 705/14 |
| 5,854,897 A | * | 12/1998 | Radziewicz et al. ........ 709/224 |
| 5,855,008 A | * | 12/1998 | Goldhaber et al. .......... 705/14 |
| 5,913,040 A | | 6/1999 | Rakavy |
| 5,918,014 A | | 6/1999 | Robinson |
| 5,933,811 A | * | 8/1999 | Angles et al. ................ 705/14 |
| 5,946,646 A | | 8/1999 | Schena |
| 5,946,664 A | | 8/1999 | Ebisawa |
| 5,959,623 A | | 9/1999 | van Hoff |
| 6,009,409 A | | 12/1999 | Adler |
| 6,009,410 A | | 12/1999 | LeMole |
| 6,026,368 A | | 2/2000 | Brown |
| 6,036,601 A | | 3/2000 | Heckel |
| 6,067,570 A | | 5/2000 | Kreynin |
| 6,085,229 A | | 7/2000 | Newman |
| 6,115,040 A | * | 9/2000 | Bladow et al. ............. 345/335 |
| 6,119,098 A | * | 9/2000 | Guyot et al. ................. 705/14 |
| 6,128,601 A | * | 10/2000 | Van Horne et al. .......... 705/34 |
| 6,151,600 A | | 11/2000 | Dedrick |
| 6,151,620 A | * | 11/2000 | Madsen et al. ............. 709/204 |
| 6,169,542 B1 | * | 1/2001 | Hooks et al. ............... 345/327 |
| 6,173,316 B1 | * | 1/2001 | De Boor et al. ............ 709/218 |
| 6,178,453 B1 | * | 1/2001 | Mattaway et al. .......... 709/227 |
| 6,216,112 B1 | * | 4/2001 | Fuller et al. .................. 705/14 |
| 6,243,716 B1 | * | 6/2001 | Waldo et al. ............... 707/202 |
| 6,279,036 B1 | * | 8/2001 | Himmel et al. ............. 709/224 |
| 6,298,218 B1 | * | 10/2001 | Lowe et al. .................. 455/66 |
| 6,310,873 B1 | * | 10/2001 | Rainis et al. ............... 370/356 |

FOREIGN PATENT DOCUMENTS

| | | |
|---|---|---|
| WO | WO 97/27531 | 7/1997 |
| WO | WO 97/32257 | 9/1997 |
| WO | WO 97/32258 | 9/1997 |
| WO | WO 97/40447 | 10/1997 |
| WO | WO 97/43724 | 11/1997 |
| WO | WO 97/46946 | 12/1997 |
| WO | WO 98/35300 | 8/1998 |

* cited by examiner

TARGETED NETWORK VIDEO DOWNLOAD INTERFACE

BACKGROUND OF THE INVENTION

1. Field of the Invention

This invention relates generally to network access schemes and, more particularly, to an interface for targeted network video download.

2. Description of the Related Art

The early beginnings of the network commonly referred to as "the Internet" involved scientists, researchers, and technology experts exchanging information over a secure computer network. Now, the Internet is fast becoming popular with the general populace not just for information exchange, but also for entertainment and recreation. Users can access thousands of files at Internet sites that contain text, graphics, video, and audio content by using computer browser programs that navigate the collection of such sites commonly called the "world wide web".

For the typical home user, access to the Internet is gained by connecting their computer to an Internet service provider (ISP) through a telephone line, although other connection services are gaining popularity. In most cases where a home user has an ISP, the user gains access to the Internet through the ISP in exchange for a fee paid by the user. The connection from the user computer to the ISP can be virtually any type of network access, such as typical analog telephone line access through a local exchange carrier or telephone company. Other connection services include cable services, and Digital Subscriber Line (DSL) services.

For typical telephone connections, an ISP will usually have several telephone numbers available in a user's local calling area for a dial-up connection. A modem is connected between the user computer and the telephone line, to provide an interface between the digital data used by the computer and the analog signal transmitted over the telephone line. The user uses a dial-up connection utility program to connect the user computer to the ISP system via the modem. Such a connection system can provide data exchange rates of 36K bytes per second upload (computer user to ISP) and up to 56 K bytes per second download (ISP to computer user). The connection from the ISP to the Internet "back bone" is typically over relatively expensive, high-speed digital lines such as fiber optic cable over T1 or T3 connections that can provide data exchange rates of 1 M bytes per second or greater.

Recently, Internet service companies have begun to provide Internet content to users based on the broadcast television model of content delivery. That is, Internet content is delivered to users for no charge, in exchange for the content being delivered with advertising materials, which are observed by viewers. The companies who provide the advertising materials pay fees to the Internet content providers, the ISPs, for the advertising exposure in the hope that it will keep their products and services uppermost in viewer's minds and will influence purchasing decisions. The fees paid by advertisers are typically a function of click-through rate, which is the rate of ad viewers who visit the advertiser's web site from the banner ad.

The Internet advertising typically consists of images that take up a portion of a user's browser window on the computer display screen, so-called "banner" advertising. The banner advertising leaves most of the browser window free for viewing, and typically places the banner across a top area of the window. A typical Internet access-for-advertising arrangement uses a dial-up connection that continuously downloads a banner ad from the ISP while the user is connected. That is, as soon as the user's browser or viewer is ready for a new banner ad, a new banner ad is downloaded from an ad server. The download may or may not interfere with the user's Internet activity.

Because the banner advertising occupies a relatively small area of the user's display window, the advertising does not preempt viewing of Internet content. Thus, banner advertising does not intrude on the user's Internet experience, but because it is static, it unfortunately can rather easily be ignored by the user. This is unlike the model of broadcast television, which generally ensures that no other display interruption will occur during the viewing of advertising content. Moreover, banner advertising does nothing to catch the attention of the user, and this reduces the likelihood that a user will take the time to view the banner advertising, and reduces its effectiveness.

Video images, comprising data files that provide full-motion video displays, can be viewed over the Internet. Video files are desirable for providing a moving image display, with audio, which will more likely attract and hold a viewer's interest. Video files, however, are relatively large and can take an inordinate amount of time to download. Banner ads may require 5 K to 25 K bytes of data, but a video file of 30 seconds duration may require 1.3 M bytes of data, even with data compression. As noted above, banner ads are sufficiently small that they may be downloaded without notice by a user while the user is viewing Internet content. In contrast, video files are so large that a user's Internet viewing almost certainly would be interrupted while the large file was being downloaded. Hence, video files are not conducive to the access-for-advertising, broadcast television model of providing Internet access.

Compounding the greater amount of time necessary to download video files is the problem of variety and staleness. Viewers can quickly become familiar with video advertising images, just as with television commercials in the broadcast context. Experience is showing that the Internet user has a short attention span. Therefore, it is important to provide the user with a variety of advertising that is constantly refreshed. If video advertising is to be useful for the Internet, then it is important to provide a variety of video files, notwithstanding the fact that such files take longer to download. With these conflicting ideals, it can be seen that video advertising is not currently practical in the access-for-advertising model of Internet access, because they take a greater amount of time to download than banner advertising, and they must be refreshed frequently to avoid becoming stale.

From the discussion above, it should be apparent that there is a need for an Internet access-for-advertising technique that provides Internet content to users along with video advertising that will more likely hold the interest and attention of Internet users and also ensures a fresh supply of video files, without interrupting the Internet experience of the user. The present invention fulfills this need.

SUMMARY OF THE INVENTION

The present invention provides a technique for providing free Internet access to a user, in which an access control system sends video advertising files to a user who gains access to the Internet through a network connection that includes a viewer program that operates independently of the user's browser and e-mail programs. The viewer receives ads from the access control system and manages an ad pool that collects multiple video advertising files. Video advertising files are downloaded when the user is not actively using the bandwidth of the Internet connection to download Internet content. The viewer program periodically opens a viewer window, which opens on top of any other open windows, and in which an ad from the ad pool is displayed. When one or more video ads are finished, the viewer window is hidden or made an inactive window for a quiet interval. At the conclusion of the quiet interval, the viewer widow is activated and the next ad in the ad pool is displayed. The viewer program cycles through existing ads in the ad pool until a new ad is received from the access server. The viewer program manages the ad pool such that the oldest ad is discarded when a new ad is received, and such that each ad is displayed or viewed in order of download for approximately as long as it takes an ad to be downloaded. This ensures that ad viewing can continuously cycle through the ad pool with the minimum of repetition, and with no interruption to the user's Internet experience. In this way, the invention keeps the ad pool fresh within a predetermined ad pool size, and provides Internet content to users for no charge or fee, and also ensures a fresh supply of video advertising files that will more likely hold the interest and attention of the Internet user.

In one aspect of the invention, the viewer program provides fraud detection features to ensure that users do not disable the viewer program. In this way, advertisers can be confident that their video ads will be viewed by the intended audience. In another aspect of the invention, users are provided with a link window that permits users to select a web site that corresponds to one of the video ads in the ad pool. Selecting the web site of a video ad sponsor results in the user's browser receiving content from the sponsor's web site.

Other features and advantages of the present invention should be apparent from the following description of the preferred embodiment, which illustrates, by way of example, the principles of the invention.

DESCRIPTION OF THE PREFERRED EMBODIMENT

Figure 1:
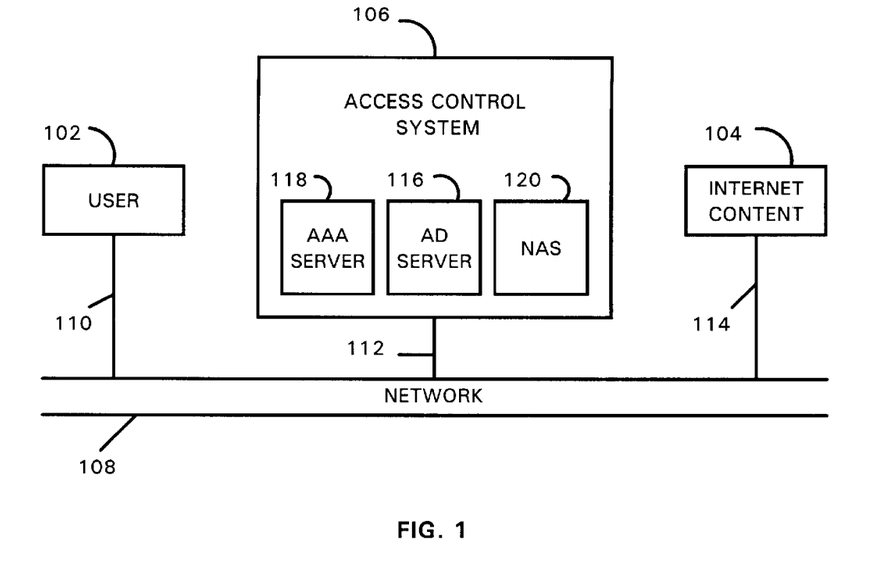
FIG. 1 is a representation of a system that provides Internet access in accordance with the present invention.

FIG. 1 is a representation of a system 100 that provides Internet access in accordance with the present invention. A user computer 102 gains access to Internet content from servers 104 through an access control system 106 that provides video advertising files. User requests for service, receipt of Internet content, and user communication with the access control system 106 all take place over a network that includes conventional telephone lines and high-speed digital access lines collectively referred to as the Internet 108. The Internet content that can be received includes e-mail, ftp files, "World Wide Web" content, chat services, and all other content available through the Internet. Thus, the user 102 is connected via a network connection line 100 that typically is a conventional analog telephone line. Similarly, the access control system 106 is connected to the Internet via a connection 112 and the Internet content servers 104 are connected via a connection 114.

The access control system 106 includes a Network Access Server (NAS) 116, an Access, Authorization, and Accounting (AAA) server 118, and an Advertising file (Ad) server 120. The NAS identifies dial-up network connections initiated by users and assigns Internet protocol (IP) addresses to the connections, taking the IP addresses from a pool of available IP addresses established by the service provider. The AAA server 118 communicates with a standard protocol, such as commonly referred to as Remote Authentication Dial-In Service (RADIUS) or Terminal Access Controller Access Control System (TACACS), or the TACACS+ system from Cisco Systems, Inc. of San Jose, Calif. USA. Other means of access authorization can be readily implemented by those skilled in the art.

In the preferred embodiment, the AAA server authorizes each user to have access to the network and performs various accounting functions to maintain a record of users who have logged onto the network and at what time, as well as other functions such as loading specific network profile information. One such network profile information, for example, is referred to as Virtual Private Dial Network (VPDN) information. The Ad server 120 provides ad files and communicates with the AAA server 118 to deny a user access if fraud is detected in connection with that user. Fraud detection is described in greater detail below. In the preferred embodiment, each of the Network Access Server 116, AAA server 118, and Ad server 120 comprise a separate, independent server computer. This provides the greatest reliability, responsiveness, and user accommodation. It should be understood, however, that the functionality of all three may be provided in a single machine.

In a system where a user will connect to the Internet through a dial-up connection over an analog telephone line, the user will launch a dial-up connection program that causes the user computer to contact the AAA server 118. The AAA server receives identification information from the user and authenticates that user for permission to receive Internet access. If desired, the AAA server may access accounting and compliance records to check for detected usage fraud and the like. If permission is indicated, then the AAA server provides an approval signal to the NAS server, which permits the user to have access to the Internet. Alternatively, the ISP may revoke a user's access by removing the user's account information from the AAA server because of previously detected fraud.

In accordance with the invention, a user 102 receives ads from the access server 106 and maintains a user ad pool in which video advertising files are collected. Each video advertising file contains sufficient data to provide a video "program" that typically has a run time of between thirty seconds and 2.5 minutes. It should be understood that faster connections and download technologies could be used to increase the program length without affecting the user's access. A viewer program at the user 102 manages the ad pool such that the oldest ad is discarded when a new ad is received, and such that the expected or average time to download an ad file is approximately equal to the total time an ad is displayed from the ad pool.

For example, if each ad in the ad pool has a 30-second playing time, and if the average download time for an ad file is expected to be fifteen minutes, then each 30-second ad should be played thirty times before the ad is cycled out of the ad pool. In this way, any single ad should have fifteen minutes of total display time before deletion. Thus, the ads are shown from the ad pool so that download time is averaged to be approximately equal to the total display time.

As described further below, a "quiet interval" during which no ads are shown can be used to automatically reduce the number of times an ad would otherwise be shown. More particularly, given the 15-minute download time and the corresponding 15-minute display time described above, it may be desirable to provide a portion of the display time as a "quiet interval" during which the user will see no ads, but during which ads will continue to be downloaded. A ratio of 1:5 may be used, so that 2.5 minutes of ad display will be followed by 12.5 minutes of no display. When a new ad is downloaded, the oldest ad will still be deleted. Thus, in the example above, an ad in a system with a 12.5 minute quite interval will be shown five times (during the 2.5 minute display interval) rather than thirty times.

In the preferred embodiment, an initial ad pool of ad files is downloaded or otherwise installed with the viewer program at the user computer before the user can utilize the Internet access system and viewer program. Thereafter, an expected Internet connection speed is assumed such that ad files can be continuously downloaded during the user's Internet access, and an ad file should complete downloading approximately when the oldest ad file in the ad file pool will have been played the appropriate number of times. For example, using a 28.8 K band modem, a 30-second video clip using conventional technology can generally be downloaded in no more than fifteen minutes of a user's Internet access.

More particularly, the expected average ad file download time sets the number of plays for each ad before it should be cycled out of the ad pool. For example, if the Internet connection speed (baud rate) of the user's network connection is such that an ad of typical size requires fifteen minutes to download, then the number of plays for each thirty-second ad before cycling out (in accordance with the example given above) should be thirty. Such a connection speed may be provided, for example, by a 28.8 K baud modem. Accordingly, the ad pool will be initially stocked so that, after a sufficient total time of Internet access by the user to provide for fifteen minutes download of a new ad file, the oldest thirty-second ad in the ad pool should have been played thirty times. Setting the system design in this way minimizes the amount of operational sophistication needed by the viewer program for proper management of the ad pool, so that no tracking of individual ad files is necessary. If the speed of the Internet connection is faster than 28.8 K, or if the bandwidth otherwise improves, ads of greater size may be downloaded to preserve the fifteen minute average download time.

Video advertising files are downloaded when the system detects that the user is not actively using the bandwidth of the user's Internet connection 110 to download Internet content. During the time a user is connected to the Internet via the access control system 106, the viewer program is continuously running, and periodically opens a viewer window, on top of any other active window, in which an ad from the ad pool is displayed. When the video ad is finished, the viewer window is closed for a quiet interval. At the conclusion of the quiet interval, the viewer widow is opened and the next ad in the ad pool is displayed. The viewer program cycles through existing ads in the ad pool until a new ad is received from the access server.

Those skilled in the art will appreciate that the Internet content servers 104 comprise multiple file servers at which web site files are stored. Those skilled in the art also will appreciate that the user computer 102, access control system 106 computers, and Internet content servers 104 can all have a similar computer construction.

Figure 2:
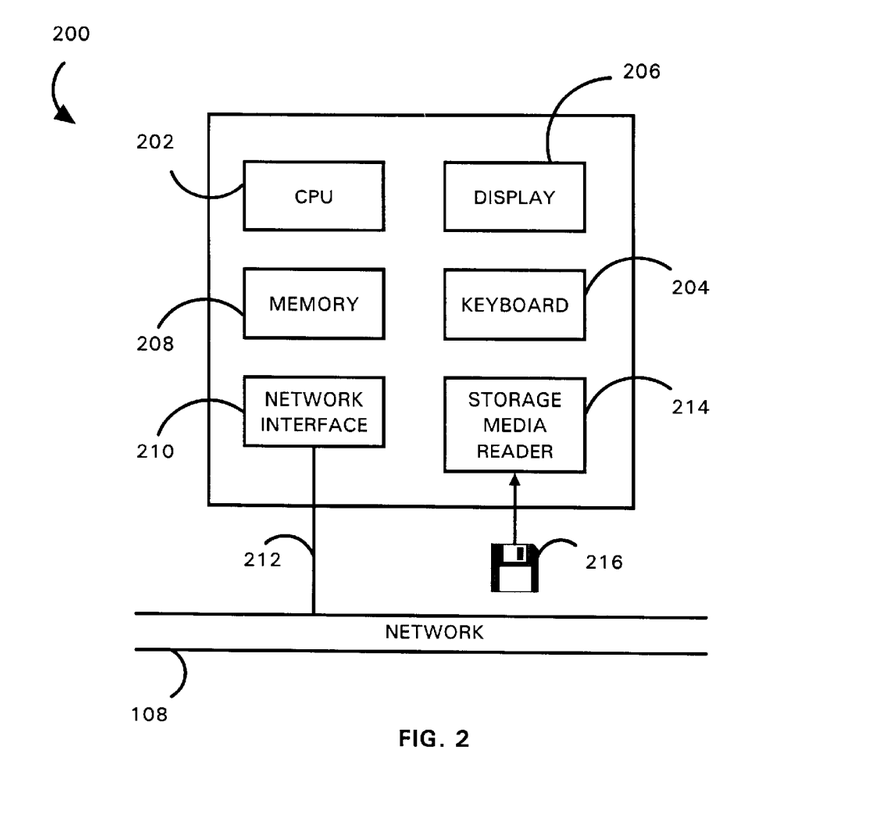
FIG. 2 is a representation of a computer of the FIG. 1 system.

FIG. 2 is a block diagram of an exemplary computer 200 such as might comprise any of the computers 102, 104, 106. Each computer 200 operates under control of a central processor unit (CPU) 202, such as a "Pentium" microprocessor and associated integrated circuit chips, available from Intel Corporation. A user can input commands and data from a keyboard 204 and can view inputs and computer output at a display 206. The display is typically a video monitor or flat panel display. The CPU operates under control of programming steps that are stored, temporarily, in memory 208 of the computer. Each computer communicates with the Internet 108 through a network interface 210 that enables communication over a connection 212 between the network 108 and the computer 200. The computer also can receive computer instructions, or data, from a storage media reader 214. The storage media reader 214 receives storage media 216 from which it can read stored information. That is, the storage media can contain program steps that are executed by the CPU to perform a method for providing Internet access as described above. The storage media thereby comprises a program product that embodies a storage media that is received by the storage media reader.

Figure 3:
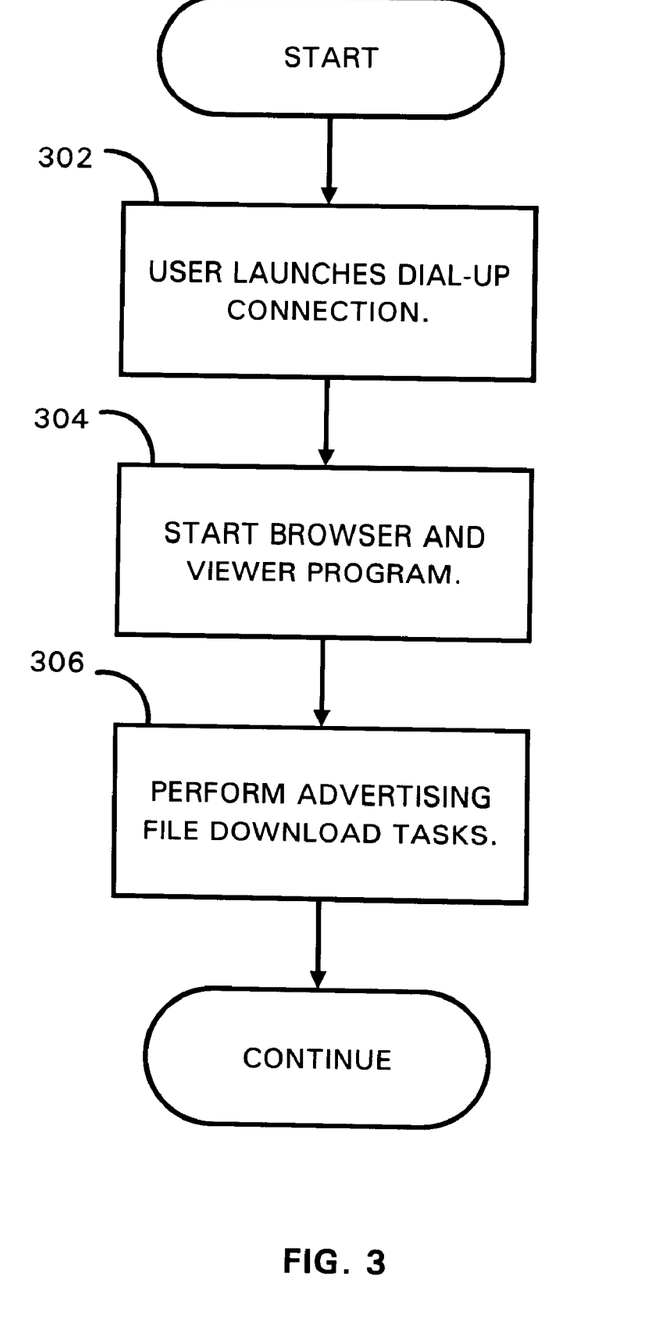
FIG. 3 is a flow diagram that illustrates the processing steps executed by the computer processing system of FIG. 1 to implement the Internet access technique in accordance with the present invention.

FIG. 3 is a flow diagram that illustrates the processing steps executed by the computer processing system 100 of FIG. 1 to implement the Internet access technique in accordance with the present invention. In the first step, represented by the FIG. 3 flow diagram box numbered 302, the user launches an Internet access program constructed in accordance with the invention that causes launch of the dial-up connection program, which will dial a prescribed telephone access number for the ISP. In the next step, after establishing communication, the system starts the viewer program. A browser program is preferably started as well, to display a predetermined web page such as the home page of the Internet access provider. The operating system of the user's computer will launch the appropriate Internet browser application, and the dial-up connection program for the no-charge ISP will start the viewer application program. This processing is represented by the flow diagram box numbered 304. Next, after the browser and viewer have been launched, the system performs ad file download tasks and ad pool management, as described further below. This processing is represented by the FIG. 3 flow diagram box numbered 306.

Figure 4:
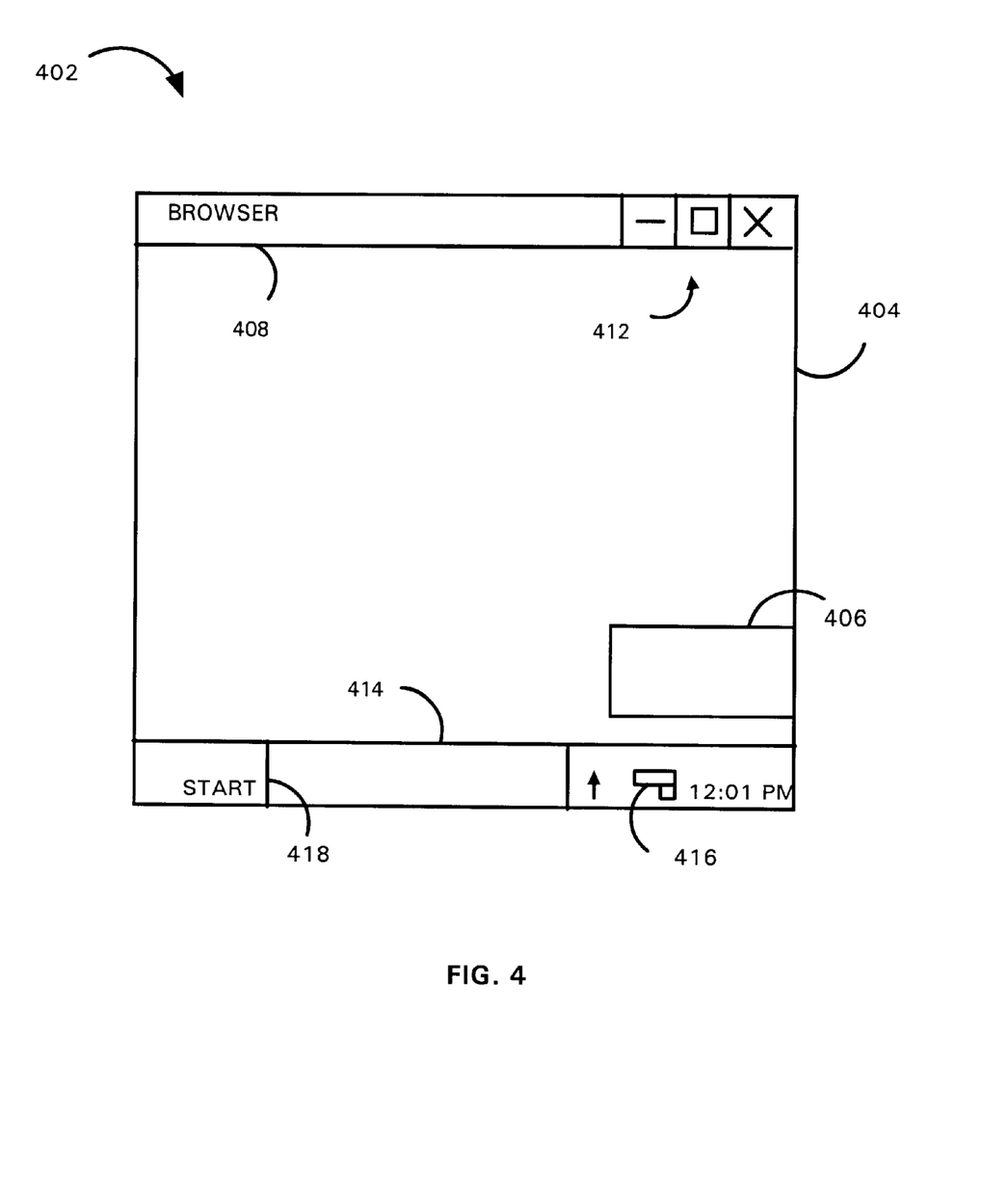
FIG. 4 is a representation of the display viewed by a user at the computer illustrated in FIG. 2.

FIG. 4 is a representation of the display window 402 viewed by a user at the computer illustrated in FIG. 2, showing a browser application window 404 with a viewer window 406 in the lower right corner of the display window. The browser window contains display artifacts that should be familiar to those skilled in the art, including a menu bar 408 with title, window sizing icons 412, and a tray 414 of the display window that includes an icon 416 for the viewer program. The "START" icon 418 provides access to a variety of operating system commands and will be familiar to those skilled in the art. Although the display 402 shows a configuration typical for an operating system such as "Windows 98" by Microsoft Corporation, it should be understood that the viewer program also can be interfaced with other computer operating systems, such as the Macintosh operating system by Apple Computer Corporation and the various UNIX variants that are available.

Figure 5:
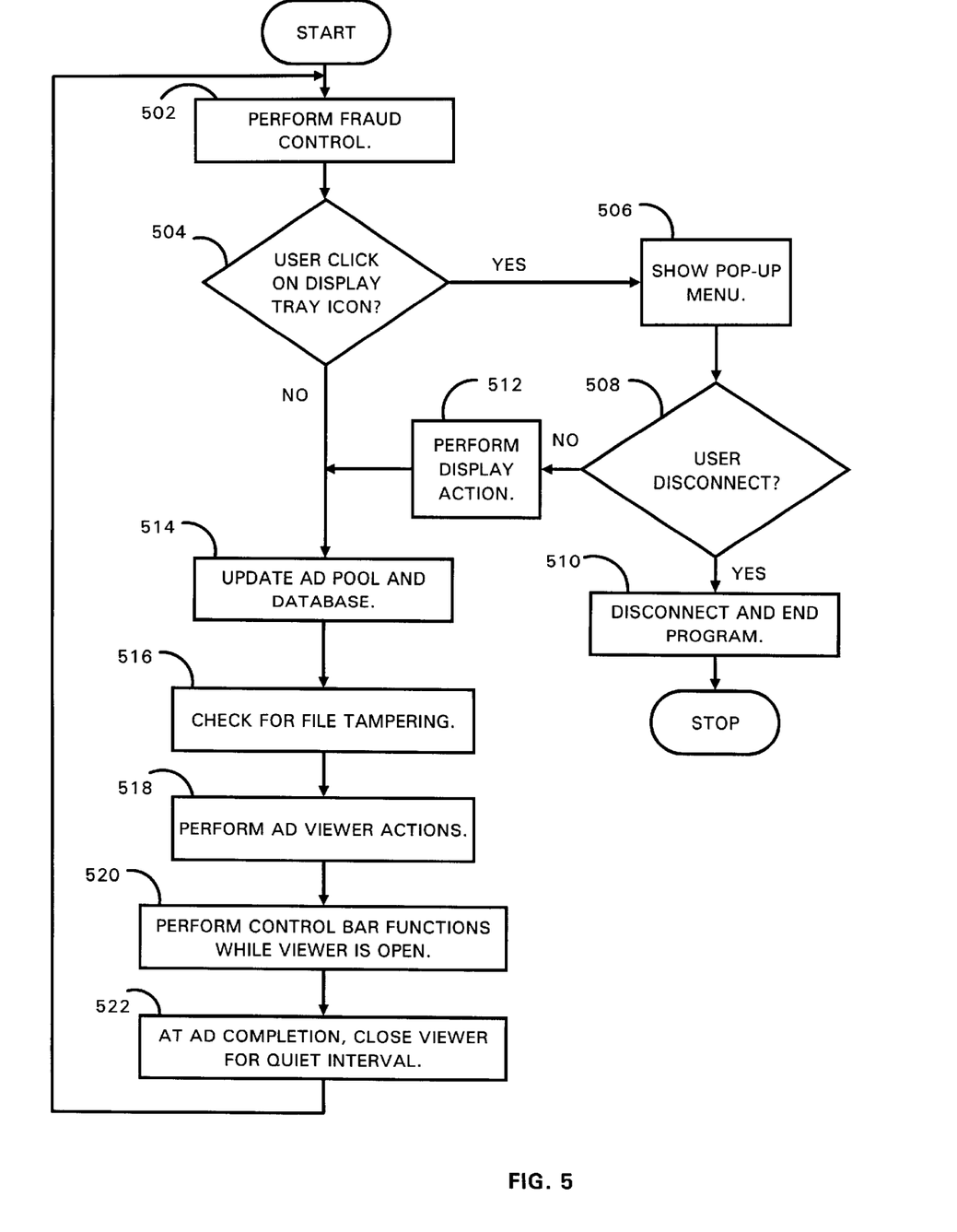
FIG. 5 is a flow diagram that illustrates the processing steps performed by the system illustrated in FIG. 1 in providing Internet access.

FIG. 5 is a flow diagram that illustrates the processing steps performed by the system 100 illustrated in FIG. 1 in providing Internet access to a user without charge, after the user first launches the dial-up connection program and establishes communication with the access control system and, in particular, the Ad server, as indicated in box 302 of FIG. 3. Those skilled in the art will understand that a user may, at any time, halt operation of the free access program by losing a line connection or terminating the connection with the user's operating system. The first step indicated in FIG. 5 following establishment of communications is to perform fraud control. This is of critical importance because advertising sponsors, who are being asked to pay the operating costs of the access server, will only be willing to pay costs if they have reasonable assurances that users are, in fact, viewing the video ads. The fraud control step 502 provides this assurance.

In particular, the fraud control step 502 involves sending a "Pulse" message to the Ad server. The fraud Pulse message is sent at regular intervals and contains a user identification number (user ID) and a date and time indication. If the Ad server does not receive a Pulse message from a user when such a message is expected, then the Ad server will terminate the communications session with the user. This can be done, for example, by the Ad Server sending a termination message to the viewer program to terminate, or to the NAS to deactivate the user's IP address. Other means of terminating access upon command by the Ad server are also suitable. A predetermined interval of, for example, five minutes should be sufficient to ensure that users are not attempting to bypass ad viewing. Thus, if the Ad server does not receive a Pulse message once every five minutes, communication will be terminated. The fraud interval may be set as desired.

Fraud control can be implemented using an encryption method for network authentication rather than the Pulse message and disconnection technique described above. Such a fraud control system might be implemented with a custom authentication server and custom authentication protocols. In addition, a number of standard, commercially available authentication servers can be used with an encryption technique that keeps an access name and password hidden from the user. In this way, a user would not be permitted to complete the log-on process without using the supplied fraud control program to make the network connection. This would ensure that the supplied fraud control program runs on the user machine as a requirement of permitting Internet access, and is preferred where maximum fraud security is desired.

In the next step of operation, represented by the FIG. 5 decision box numbered 504, the dial-up connection program results in a viewer icon located in the display tray (see FIG. 4), and the viewer program thereafter checks to determine if the user has clicked on the display tray icon. If the user has clicked on the icon, an affirmative outcome at the decision box 504, then a pop-up menu is displayed, as indicated at box 506. The pop-up menu permits the user to view parameters and actions. For example, the pop-up menu may show items including "Disconnect", "Settings", and "Help". The user may select any one of these three alternatives. It should be noted that a "Dial-Up Networking" icon may be automatically placed in the display tray by the computer operating system. Those skilled in the art will understand that the Internet connection also can be terminated by the user through the Dial-Up Networking icon.

User selection of "Disconnect" is indicated as an affirmative outcome at the FIG. 5 decision box numbered 508. If the user selects "Disconnect" from the pop-up menu, then at box 510 the dial-up program is halted and the user is disconnected from the Internet, ending the session. If "Disconnect" is not selected, a negative outcome at the decision box 508, then at box 512 the system performs the display action associated with the action. For example, the resulting actions if "Help" is selected include display of the "help" menu. Those skilled in the art will be able to determine the set of topics that would be helpful to users and should therefore be included in the help menu. If the user selects "Settings" from the pop-up menu, then a dialog box will be shown that will contain program operating parameters. The user may want to change the display time options. For example, the user may select between seeing ads for 30 seconds every three minutes, and seeing 2.5 minutes straight viewing time of ads every 15 minutes.

If the user clicks on a display icon (box 506) and then performs a display action (box 512), or if the user does not click on the display tray icon (a negative outcome at the decision box numbered 504), then the next operation step is the same, as indicated at the box numbered 514: update the ad pool and database. Such update actions involve the viewer program removing the oldest ad in the ad pool if a new ad has been successfully downloaded. Any local databases are updated with ad file information from the Ad server, such as the new ad name, ad ID, product, sponsor company, ad file name, path, and size. In the preferred embodiment, the local database is kept secure from access by the user. After the ad pool update action, the system next checks for file tampering at the flow diagram box numbered 516.

To detect tampering, the system checks for a match between ad file information in the secure local database and actual ad file information. The local database is maintained by receiving ad file information along with a new ad file. The received ad file information includes, for example, file name, path, file size, creation date, and the like. For example, each ad in the ad pool will have a file size specified by received ad file information in the secure database. The operating system of the user computer can determine the actual block size of the file. Other file parameters may be checked for changes. If there is a discrepancy, a mismatch-indicating message is sent to the Ad server with the user ID and the date and time of detected discrepancy. The Ad server records the fact that the viewer sent a mismatch message, an indication that possible fraud has occurred. The viewer program then displays a fraud message on the viewer's computer. Preferably, the fraud message indicates that fraud has been detected and that such fraud comprises a violation of the usage agreement. The message can request that the user contact the ISP, or some other corrective or remedial action may be suggested. The dial-up connection program is then terminated and user access is halted. Thus, the fraud detection ensures that the file entries in the local database match the entries expected by the authorization server. This ensures that the user has not tampered with the files.

If no fraud is detected, the user continues to be provided with Internet access. The next processing step, at the flow diagram box numbered 518, is to perform ad viewer actions. The ad viewer actions comprise the automatic processing by the viewer program to periodically display video ads from the ad pool. The ad viewer actions are described further below in conjunction with FIG. 6. Next, during ad showing, the viewer program detects when the display cursor is placed over the viewer window. When the cursor is over the viewer window, the viewer program causes the viewer control bar to be displayed and any user control bar actions to be performed, as indicated by the flow diagram box numbered 520. The viewer program performs the control bar functions and thereby provides a means for the user to manage the window in which the ads are viewed. The control bar function processing is described further below in conjunction with FIGS. 7, 8, and 9.

At the completion of each video ad, a "play completion" message is sent to the Ad server. This ensures that the server has the most current information available on ad viewing. One or more ad viewings comprise an ad showing interval, depending on the implementation. When the ad showing interval is completed, the viewer program hides the viewer window and enforces a quiet interval during which no ads are shown. This processing is represented by the flow diagram box numbered 522. The viewer program then enforces the quiet interval, and processing control returns to the fraud control operation represented by the FIG. 5 flow diagram box numbered 502.

Figure 6:
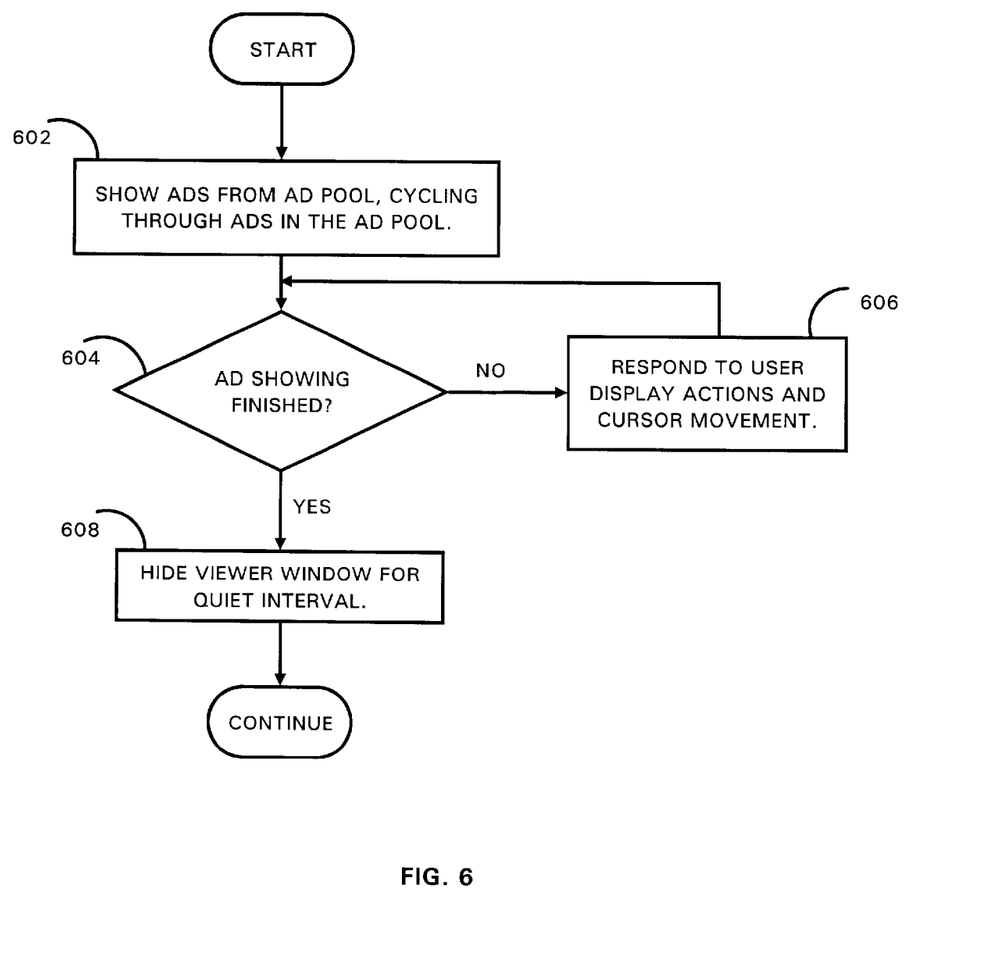
FIG. 6 is a flow diagram that illustrates the processing steps performed by the system illustrated in FIG. 1 in managing the playback of video ads.

Further details of the viewer program operation during ad showing are illustrated in the FIG. 6 flow diagram. As indicated by the FIG. 6 flow diagram box numbered 602, the viewer program first shows ads from the ad pool stored in the user's computer. The viewer program keeps track of the order in which the ads should be shown, such as by keeping an ad information table of the local database in the computer memory, to cycle through the ads in the ad pool in proper viewing sequence. As noted above, the ads are shown in order of download, from oldest to newest, and each time a new ad is downloaded, the viewer program deletes the oldest ad from the ad pool. Also as noted above, a "play completion" message is sent after completion of each ad showing. The play completion message includes the user ID, ad name or ID, and the date and time of completion. If the Ad server is not available to receive and acknowledge the play completion message, then the play completion message is temporarily stored in the viewer program message queue. This is part of the processing in box 602.

In the next viewer program operating step, represented by the decision box numbered 604, the program checks to determine if the ad showing interval has completed. As noted above, the viewer program opens or launches the viewer window at regular intervals, showing ads for a predetermined time interval and then hiding the viewer window or making it inactive. The viewer window runs on top of any other open window and provides a picture-in-picture viewing format. For example, in the preferred embodiment, the viewer program shows 2.5 minutes of ads in the viewer window, cycling through ad pool files that each provide a 30-second video presentation. Thus, five consecutive ads will be shown during an ad showing interval. After the 2.5 minute ad showing interval, the viewer program implements a 12.5 minute quiet interval during which the viewer window is hidden or made inactive. Other intervals may be selected, depending on programming needs. Alternatively, each ad showing may comprise an ad showing interval, so that a 15-minute period still will include a total of 2.5 minutes of ad viewing. That is, a 30-seconds viewing interval will be followed by a 2.5 minute quiet interval.

If the ad showing interval is not completed, a negative outcome at the decision box 604, then the viewer program detects and responds to any user display actions and cursor movement, as represented by the flow diagram box numbered 606. If the ad showing interval is complete, a positive outcome at the decision box numbered 604, then the viewer window is hidden or made inactive for the duration of the quiet interval. System processing then continues.

As noted above for the FIG. 5 box numbered 520, the viewer program detects when a user moves the cursor over the viewer window, and as described above for the FIG. 6 box numbered 606, the viewer program responds to such viewer display actions. Those skilled in the art will be familiar with how the viewer program can be programmed to obtain such information from the computer operating system. Moving the cursor over the viewing window display area and clicking on the ad being shown causes the viewer program to direct the user's browser to the web site associated with the ad (according to a URL stored in the local database) and sends an "ad click" message to the Ad server with user information such as user ID, ad ID, and date and time of click. If the Ad server is not available to receive and acknowledge the ad click message, then the ad click message is temporarily stored in a message queue of the viewer program for later sending. Other messages may also be stored in the message queue, except that only one "Pulse" message described above, which confirms a user connection, should be permitted in the queue, to prevent the Ad server from being flooded if it becomes offline for an extended time. Moving the cursor over any portion of the viewer window causes the viewer program to display the viewer control bar, which then permits the user to modify the ad window viewing experience.

Figure 7:
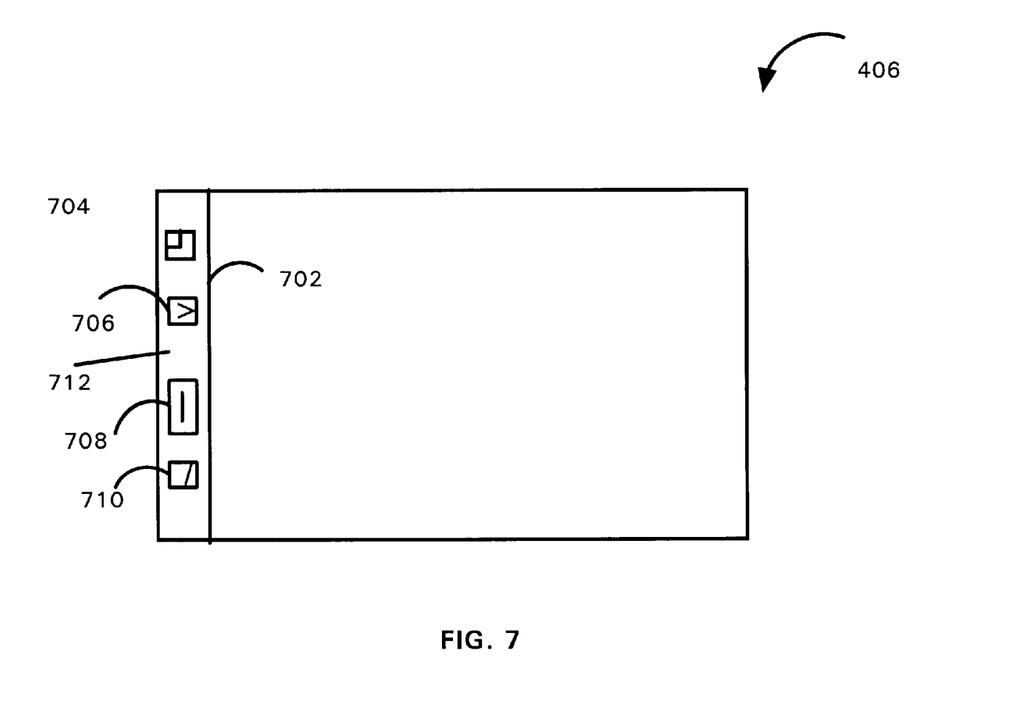
FIG. 7 is a representation of the viewer window display that is shown during ad playback.

FIG. 7 illustrates details of the viewer window 406 (FIG. 4) and control bar. The window control bar 702 is a vertical bar that includes a sizing icon 704 that permits a user to modify, within predetermined limits, the size of the window 406. The viewer program does not permit moving the viewer window completely off the user's desktop display area, and does not permit reducing the size of the window display beyond a minimum size. This ensures advertising sponsors of a minimum display area for their ads. The control bar 702 also includes a "Recent Ads" button 706 that opens a pop-up menu that lists the ten most recent ad sponsor names, as described further below, for accessing ad web sites. The viewer window of FIG. 7 also includes a volume control 708 that adjusts playback sound level. Finally, the viewer window has a mute button 710, for viewing ads without sound. A blank area 712 of the control bar provides a Move Bar that permits the user to move the viewer window 406 within the desktop area in usual windowing fashion by clicking and dragging.

Figure 8:
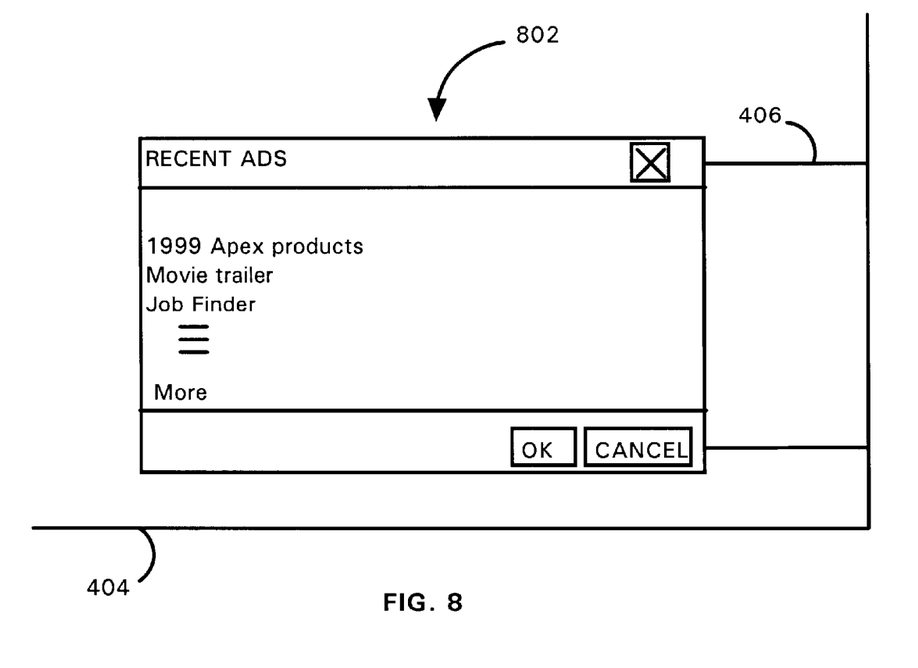
FIG. 8 is a representation of the Recent Ads pop-up menu selected from the viewer window of FIG. 7.

FIG. 8 shows an exemplary Recent Ads pop-up menu 802 that results from user selection of the Recent Ads button 706 (FIG. 7) and contains information about recently viewed ads. The menu shows the title or description of the ten most recently viewed ads of ad sponsors. Each entry in the pop-up menu corresponds to an ad in the ad pool. If the user clicks on any of the listed web sites, then the viewer program directs the user's browser to the corresponding web site.

Other suitable formats of the "Recent Ads" menu will occur to those skilled in the art.

Figure 9:
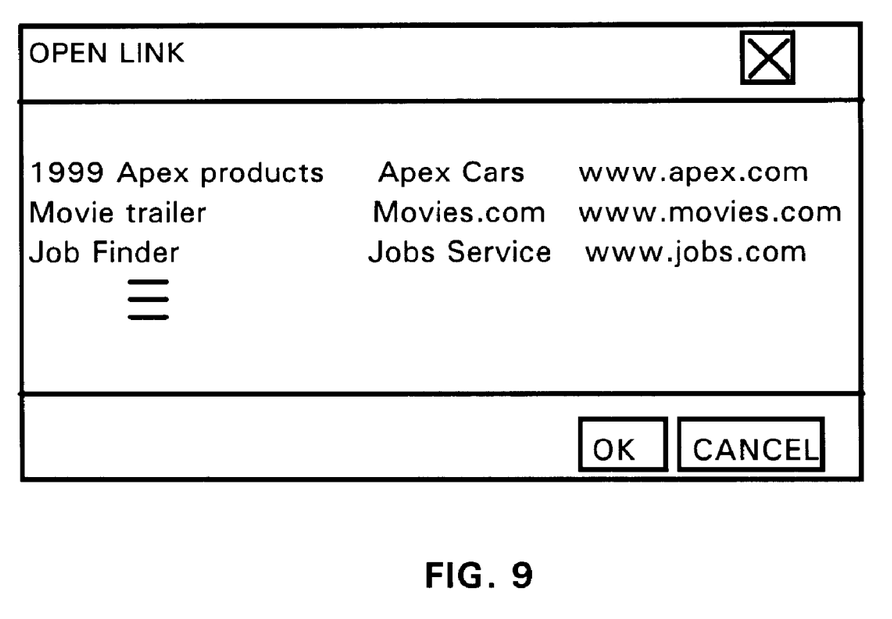
FIG. 9 is a representation of the Open Link dialogue box display that is shown during ad playback, selected from the Recent Ads display of FIG. 8.

The "Recent Ads" pop-up menu of FIG. 8 includes a "More" entry that when selected, causes an "Open Link" dialogue box to be opened. This dialogue box is shown in FIG. 9. The dialogue box lists the ad names, ad sponsor, and ad sponsor web site link. The link comprises a Universal Resource Locator (URL) address that directs the user browser to the corresponding web site. If an advertiser does not have a URL for a web site, then the FIG. 9 dialogue box inserts the web site of the ISP or some other designated web site. Thus, with the control bar and Open Link dialogue box, the user has management control of the Internet viewer window.

Figure 10:
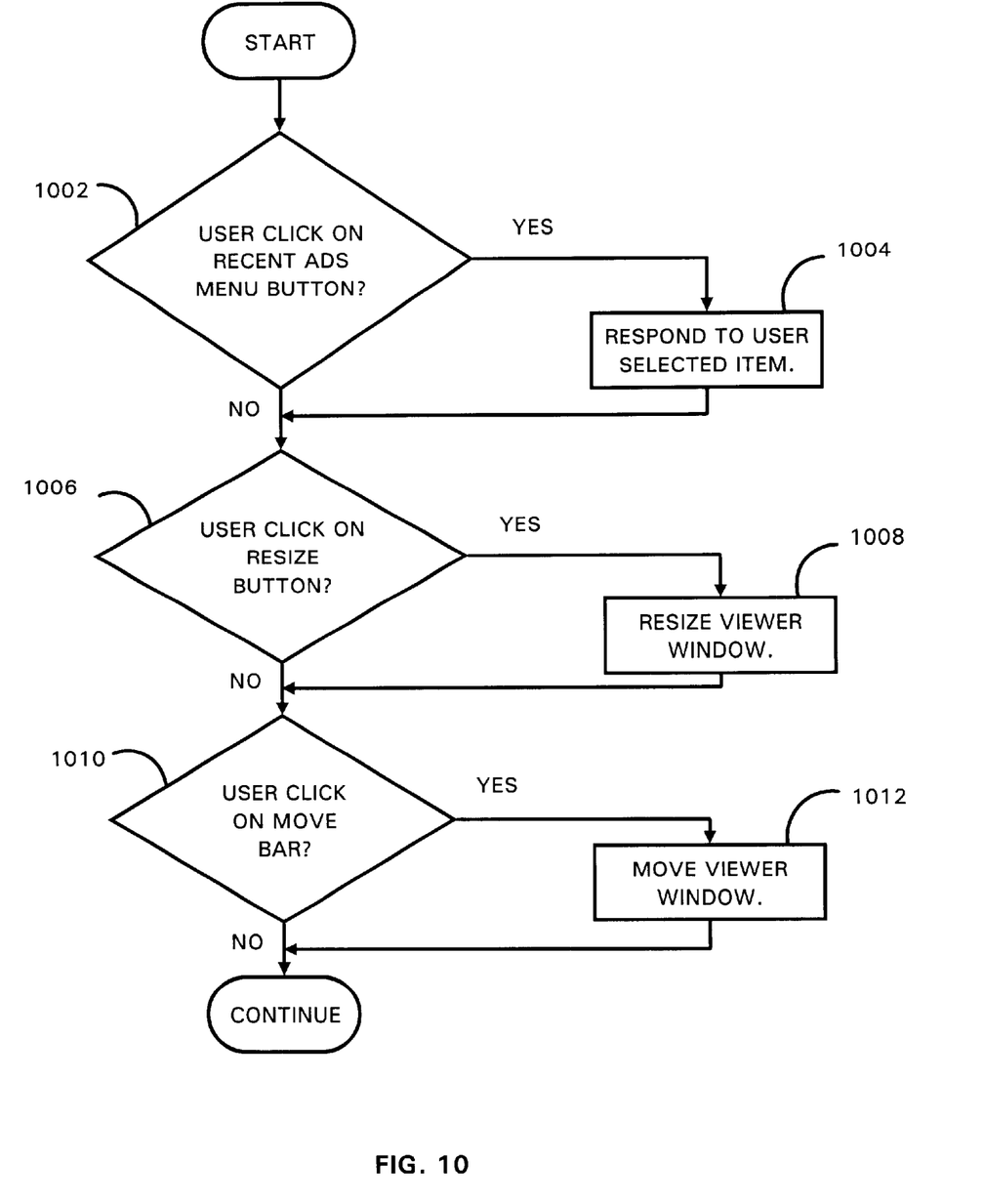
FIG. 10 is a flow diagram that illustrates the processing steps performed by the system to implement playback management control bar functions.

FIG. 10 is a flow diagram that illustrates the processing steps performed to permit the playback management control bar functions available to the user during ad showing. In the first processing step, represented by the FIG. 10 decision box numbered 1002, the viewer program detects when the user clicks on the Recent Ads control bar button 706 (see FIG. 7). If a button click is detected, an affirmative outcome at box 1002, then the viewer program responds appropriately by showing the Recent Ads menu described above. This processing is represented by the flow diagram box numbered 1004. In accordance with the invention, the user does not lose control of the browser when an ad is being shown. Therefore, if the user clicks on the Recent Ads button and the browser is directed to a sponsor's web site, the viewer window continues to show ads and continues to be active. Therefore, after the user clicks on the Recent Ads button and the viewer program performs its response at box 1004, or if there was no user click (a negative outcome at the decision box 1002), the viewer program operation continues.

Next, as indicated by the decision box numbered 1006, the viewer program determines if the user clicks on the resize button 704 (FIG. 7). If the user does, an affirmative outcome at the decision box 1006, then the viewer program permits resizing, within predetermined limits. The resizing operation is indicated by the flow diagram box numbered 1008. After window resizing, or in the event of no user display click (a negative outcome at the decision box 1006), the viewer program operation continues.

Finally, the viewer program determines if the user clicks on the control bar "Move" area 712 (FIG. 7). If yes, an affirmative outcome at the decision box 1010, then the viewer program permits the user to move the viewer window within the desktop display area, but will not permit the viewer to hide the viewer window. This operation is represented by the flow diagram box numbered 1012. After moving is complete at box 1012, or if there was no click (a negative outcome at the decision box 1010), the viewer program continues normal operation, including the display and download of ads.

Figure 11:
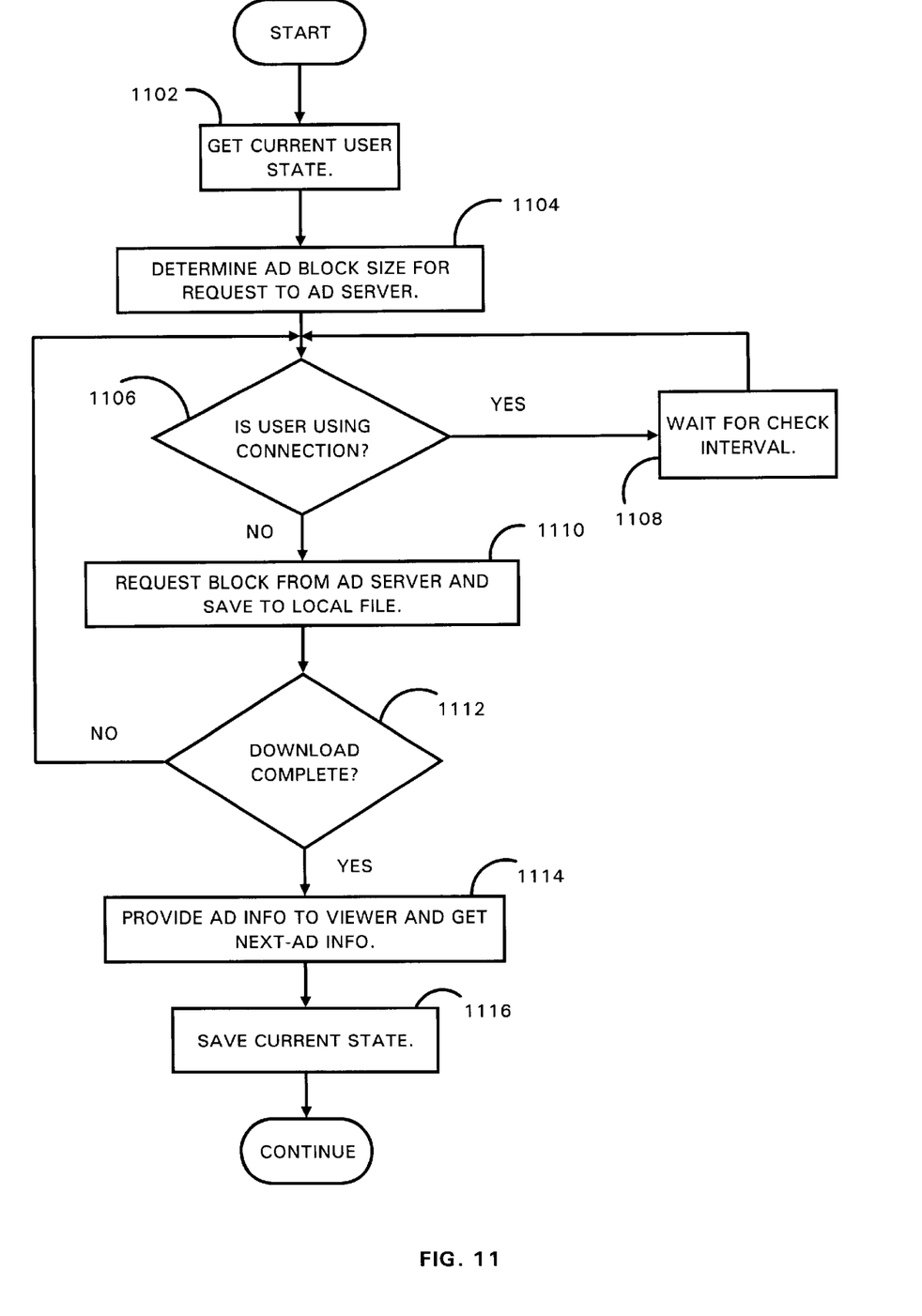
FIG. 11 is a flow diagram that illustrates the processing steps performed by the system in managing the ad download function.

As noted above in conjunction with the description of FIG. 3, the system performs ad file download tasks (box 306). FIG. 11 is a flow diagram that illustrates the processing steps performed by the system in managing the ad download function.

In the first download processing step, represented by the FIG. 11 flow diagram box numbered 1102, the current user state is stored in the local database. This information comprises status information, including the current ad file that is downloading in a background operation, where ad playback is on the play list, and the current ad file block that is being received. The state information is maintained by the viewer program so it can continue a download operation in progress even after the program has been shut down and restarted. The initial information is received from the Ad server when a new ad is requested. The viewer program then keeps track of where the download operation is, using the database to store the information. Thus, the Ad server need not store information relating to, or otherwise control operations for, the download process.

Next, the viewer program determines the ad block size to request from the Ad server, as indicated by the flow diagram box numbered 1104. The viewer program makes this determination based on the data rate available from the dial-up connection and, optionally, system resources such as processor speed, available memory, download latency, and modem speed. At the decision box numbered 1106, the viewer program next determines if the user is actively using the Internet connection (modem line) for external communication. The connection will only be indicated as currently in-use if, for example, the user is in the middle of downloading a web page or receiving a file from the Internet, or sending or receiving electronic mail. If the connection is being used, an affirmative outcome at the decision box numbered 1106, then the viewer program waits for a predetermined check interval (box 1108) and then checks again (box 1106).

When the Internet connection is not being used by the user, a negative outcome at the decision box numbered 1106, the viewer program sends a request to the Ad server for the file name from which download will commence (or continue), the offset from the file start where the block should be downloaded, and the determined ad block size. The user's viewer program then receives the requested data and stores the block to a local file. These file request and saving steps will be familiar to those skilled in the art, without further explanation.

After each ad block has been downloaded, the viewer program checks to determine if the entire ad has been received. This step is indicated by the FIG. 11 decision box numbered 1112. If the download is not complete, a negative outcome at the box 1112, then processing goes back to the flow diagram box numbered 1106, where availability of the connection is determined. If all blocks in the next ad have been received, an affirmative outcome at the decision box 1112, then the viewer program updates the secure local database, provides the completed ad information to the Ad server, and obtains information for download of the next ad, as indicated by the flow diagram box numbered 1114. The viewer program next updates the current state information in the secure local database, as indicated by the flow diagram box numbered 1116. The viewer program continues with other normal processing.

The viewer program preferably includes an Application Program Interface (API) that permits its functionality to be available to other programs, as known to those skilled in the art. In addition, means other than the viewer program may be used in download control. For example, the well-known "BackWeb" client/server products from BackWeb Technologies, Inc. of San Jose, Calif. may be used for download control.

As described above, the present invention provides a technique for free Internet access in which an access server sends video advertising files to a user who gains access to the Internet through a network connection having a viewer program that runs with the user's browser to manage download and playback of ads. By downloading the video advertising files when the system detects that the user is not actively using the bandwidth of the Internet connection, the impact on the user's Internet experience is minimized. The viewer program periodically opens a viewer window, on top of the user's browser, and shows ads from the ad pool. When the ad showing is finished, the viewer window is hidden for a quiet interval. At the conclusion of the quiet interval, the viewer widow is activated and the next ad showing is performed. In this way, the invention provides Internet content to users for no charge or fee, and also ensures a fresh supply of video ads that will more likely hold the interest and attention of the Internet user.

The present invention has been described above in terms of a presently preferred embodiment so that an understanding of the present invention can be conveyed. There are, however, many configurations for Internet access systems not specifically described herein but with which the present invention is applicable. For example, use of Internet bandwidth may be detected by identifying the occurrence of Internet browser events, such as new links or page download completion. Similarly, ftp-programs and e-mail use can be watched for and avoided. Also, the viewer window control functions can be varied from that shown above. A fully configurable window or a window that pops out on the desktop could be provided, if desired. The present invention should therefore not be seen as limited to the particular embodiments described herein, but rather, it should be understood that the present invention has wide applicability with respect to providing Internet access generally. All modifications, variations, or equivalent arrangements and implementations that are within the scope of the attached claims should therefore be considered within the scope of the invention.

We claim:

1. A method of playing full-motion video advertisements on a user computer in conjunction with access to files of a network, the user computer having a display, the method comprising:

establishing a communication link from the user computer to the network launching a browser program in the user computer for viewing data content of the network files launching a video viewer program in the user computer for autonomously receiving and playing video advertisements the video viewer program detecting times when the user is not actively sending or receiving data from the network, and using such times to download video advertisements from the network to the user computer, such that the video viewer program maintains a pool of video advertisements at the user computer and performs pool management tasks automatically periodically displaying and hiding a video viewer window on the display, wherein a number of video advertisements from the pool are played in the video viewer window when the video viewer window is displayed, and the video viewer window is hidden after a predetermined number of video advertisements from the pool have been played and the video viewer window is kept hidden for a predetermined period of time before being displayed again.

2. The method of playing video advertisements at a user computer in conjunction with access to files of a network as defined in claim 1, further comprising the steps of receiving a new video advertisement from the network storing the new video advertisement in the user computer deleting the oldest video advertisement from the pool in the user computer.

3. The method of playing video advertisements at a user computer in conjunction with access to files of a network as defined in claim 1, wherein the video viewer program maintains an ad information table of a local database in the user computer.

4. The method of playing video advertisements at a user computer in conjunction with access to files of a network as defined in claim 1, further including the step of periodically performing fraud control, wherein the video viewer program sends a pulse message to an access control system at predetermined intervals.

5. The method of playing video advertisements at a user computer in conjunction with access to files of a network as defined in claim 4, wherein the video viewer program maintains an ad information table that includes video advertisement information initially received from the access control system, such that the video viewer program compares actual video advertisement information determined by the user computer with corresponding video advertisement information in the table.

6. The method of playing video advertisements at a user computer in conjunction with access to files of a network as defined in claim 5, wherein the fraud control comprises comparing ad information in the local database with actual video advertisement information for the corresponding video advertisement, and indicating fraud if there is a discrepancy.

7. The method of playing video advertisements at a user computer in conjunction with access to files of a network as defined in claim 5, wherein the video viewer program terminates the network connection if fraud is indicated.

8. The method of playing video advertisements at a user computer in conjunction with access to files of a network as defined in claim 1, further including the step of performing fraud control, comprising maintaining an ad information table in the user computer that contains information on respective video advertisements in the pool received from an access control system comparing actual video advertisement information determined by the user computer for video advertisements in the pool with the video advertisement information for corresponding video advertisements stored in the ad information table indicating fraud if the comparison shows a discrepancy.

9. A user computer that plays video advertisements in conjunction with access to files of a network, the user computer comprising:

a central processing unit that can establish communication with the network a display program memory that stores programming instructions for causing the user computer to establish a communication link from the user computer to the access control system launch a browser program for viewing data content of the network files launch a video viewer program for autonomously receiving and playing video advertisements, the video view program including program instructions for detecting times when the user is not actively sending or receiving data from the network, and using such times to download video advertisements from the network to the user computer, such that the video viewer program maintains a pool of video advertisements at the user computer and performs pool management tasks automatically periodically displaying and hiding a video viewer window on the display, wherein
- a number of video advertisements from the pool are played
- the video viewer window is hidden after a predetermined number of video advertisements have been played
- the video viewer window is kept hidden for a predetermined period of time before being displayed again.

10. The user computer that plays video advertisements in conjunction with access to files of a network as defined in claim 9, wherein the user computer stores a new video advertisement received from the network, and deletes the oldest video advertisement from the pool in the user computer.

11. The user computer that plays video advertisements in conjunction with access to files of a network as defined in claim 9, wherein the video viewer program maintains an ad information table of a local database in the user computer.

12. The user computer that plays video advertisements in conjunction with access to files of a network as defined in claim 9, wherein the user computer periodically performs fraud control, wherein the video viewer program produces a pulse message at predetermined intervals, and an access control system causes the communication link to the network to be severed if it fails to detect an expected pulse message.

13. The user computer that plays video advertisements in conjunction with access to files of a network as defined in claim 9, wherein the fraud control comprises comparing ad information in the local database with actual video advertisement information for the corresponding ad file, and indicating fraud if there is a discrepancy.

14. The user computer that plays video advertisements in conjunction with access to files of a network as defined in claim 9, wherein the video viewer program terminates the network connection if fraud is indicated.

15. The user computer that plays video advertisements in conjunction with access to files of a network as defined in claim 9, wherein the video viewer program performs fraud control by
- maintaining an ad information table in the user computer that contains information on respective ads in the pool received from the access control system
- comparing actual video advertisement information determined by the user computer for video advertisements in the pool with the video advertisement information for corresponding video advertisements stored in the ad information table
- indicating fraud if the comparison shows a discrepancy.

16. A computer-readable medium storing a program, the program playing full-motion video advertisements on a user computer in conjunction with access to files of a network, the program comprising computer-readable instructions for causing a user computer to:
- autonomously receive and play video advertisements on a display of the computer system
- detect times when the user is not actively sending or receiving data from the network, and use such times to download video advertisements from the network to the user computer, such that a pool of video advertisements is maintained at the user computer
- perform pool management tasks
- automatically periodically display and hide a video viewer window on the display
- automatically play a number of video advertisements from the video advertisement pool in the video viewer window
- automatically hide the video viewer window after a predetermined number of video advertisements from the pool have been played
- keep the video viewer window hidden for a predetermined period of time before displaying the video viewer window again.

17. The computer-readable medium of claim 16, further comprising computer-readable instructions for causing the user computer to
- receive a new video advertisement from the network
- store the new video advertisement in the user computer
- delete the oldest video advertisement from the pool in the user computer.

18. The computer-readable medium of claim 16, further comprising computer-readable instructions for causing the user computer to maintain an ad information table of a local database in the user computer.

19. The computer-readable medium of claim 16, further including computer-readable instructions for causing the user computer to send a pulse message to an access control system at predetermined intervals.

20. The computer-readable medium of claim 19, further comprising computer-readable instructions for causing the user computer to
- maintain an ad information table that includes video advertisement information initially received from the access control system
- compare actual video advertisement information determined by the user computer and with corresponding video advertisement information in the table.

21. The computer-readable medium of in claim 20, further comprising computer-readable instructions for causing the user computer to compare ad information in the local database with actual video advertisement information for the corresponding ad file, and indicate fraud if there is a discrepancy.

22. The computer-readable medium of claim 20, further comprising computer-readable instructions for causing the user computer to terminate the network connection if fraud is indicated.

23. The computer-readable medium of claim 16, further including computer-readable instructions for causing the user computer to
- maintain an ad information table in the user computer that contains information on respective video advertisements in the pool received from an access control system
- compare actual video advertisement information determined by the user computer for video advertisements in the pool with the video advertisement information for corresponding video advertisements stored in the ad information table
- indicate fraud if the comparison shows a discrepancy.

24. The method of playing full-motion video advertisements at a user computer in conjunction with access to files of a network of claim 1, wherein each video advertisement comprises a single file.

25. The method of playing full-motion video advertisements at a user computer in conjunction with access to files of a network of claim 1, wherein each video advertisement has associated therewith a number of plays.

26. The method of playing full-motion video advertisements at a user computer in conjunction with access to files of a network of claim 25, wherein the number of plays is equal to the time to download the video advertisement divided by the length of the video advertisement.

27. The method of playing full-motion video advertisements at a user computer in conjunction with access to files of a network of claim 1, the video viewer program maintaining state information in the user computer comprising whether the video viewer program is downloading a video advertisement, wherein if the video viewer program is downloading a video advertisement, then an identification of the video advertisement which is downloading and an identification of an amount of the video advertisement which has been downloaded whether the video viewer program is playing a video advertisement, wherein if the video viewer program is playing a video advertisement, then an identification of the video advertisement which is being played.

28. The user computer that plays video advertisements in conjunction with access to files of a network of claim 9, wherein each video advertisement comprises a single file.

29. The user computer that plays video advertisements in conjunction with access to files of a network of claim 9, wherein each video advertisement has associated therewith a number of plays.

30. The user computer that plays video advertisements in conjunction with access to files of a network of claim 29, wherein the number of plays is equal to the time to download the video advertisement divided by the length of the video advertisement.

31. The user computer that plays video advertisements in conjunction with access to files of a network of claim 9, the video viewer program maintaining state information in the user computer comprising whether the video viewer program is downloading a video advertisement, wherein if the video viewer program is downloading a video advertisement, then an identification of the video advertisement which is downloading and an identification of an amount of the video advertisement which has been downloaded whether the video viewer program is playing a video advertisement, wherein if the video viewer program is playing a video advertisement, then an identification of the video advertisement which is being played.

32. The computer-readable medium of claim 16, wherein each video advertisement comprises a single file.

33. The computer-readable medium of claim 16, wherein each video advertisement has associated therewith a number of plays.

34. The computer-readable medium of claim 33, wherein the number of plays is equal to the time to download the video advertisement divided by the length of the video advertisement.

35. The computer-readable medium of claim 16, further comprising computer-readable instructions for causing the user computer to maintain state information in the user computer comprising whether the user computer is downloading a video advertisement, an identification of the video advertisement which is downloading and an identification of an amount of the video advertisement which has been downloaded whether the user computer is playing a video advertisement, and an identification of the video advertisement which is being played.

* * * * *